United States Patent [19]
Furutsu

[11] 3,885,842
[45] May 27, 1975

[54] BEARING LUBRICATING DEVICE
[75] Inventor: Takashi Furutsu, Osaka, Japan
[73] Assignee: Koyo Seiko Company Limited, Osaka, Japan
[22] Filed: Sept. 21, 1973
[21] Appl. No.: 399,542

[52] U.S. Cl. ................................................ 308/187
[51] Int. Cl. ............................................. F16c 1/24
[58] Field of Search ............ 308/187, 212, 213, 214

[56] References Cited
UNITED STATES PATENTS

| | | | |
|---|---|---|---|
| 1,909,525 | 5/1933 | Curtis | 308/214 |
| 2,160,418 | 5/1939 | Horger | 308/187 |
| 3,692,372 | 9/1972 | Pineo | 308/207 |

FOREIGN PATENTS OR APPLICATIONS

| | | | |
|---|---|---|---|
| 930,700 | 7/1963 | United Kingdom | 308/187 |
| 146,724 | 9/1961 | U.S.S.R. | 308/187 |

Primary Examiner—M. Henson Wood, Jr.
Assistant Examiner—Richard A. Bertsch
Attorney, Agent, or Firm—Mason, Fenwick & Lawrence

[57] ABSTRACT

An outer race spacing member for locating two outer races of a roller bearing in position within a housing has a sealed oil mist passageway around its circumference which communicates with a lubricant supply channel extending through the housing. Mist nozzles extending from the oil mist passageway toward the areas to be lubricated in the bearing are positioned in spaced relation along the oil mist passageway. A lubricating oil mist is injected through the mist nozzles into the interior of the bearing under uniform pressure.

5 Claims, 14 Drawing Figures

BEARING LUBRICATING DEVICE

BACKGROUND OF THE INVENTION

The present invention relates to a lubricating device for roller bearings and more particularly to a device for lubricating a roller bearing with an oil mist. The lubricating device of this invention is applicable not only to tapered roller bearings but also to cylindrical roller bearings and other bearings.

Generally speaking, the oil mist used in the mist lubrication of a roller bearing is produced by an oil mist generator comprising as is commonly known, an oil tank, a venturi tube having a throat section between an air inlet at one end and a mist outlet at the other, a conduit connecting the oil tank to the throat section, and a baffle adjacent the outlet of the venturi tube, whenever compressed air flows through the throat of the venturi tube, oil in the tank is drawn into the throat and sprayed against the baffle. The larger droplet of oil in the mist will impact the baffle coalesce into a liquid and be returned to the oil tank, while the smaller droplets of sprayed oil (having an average diameter of around 1.5$\mu$) will remain suspend in the air and be supplied to roller bearings.

The oil mist created by the oil mist generator and supplied to the bearing is composed of a mixture of small droplets of the oil mixed with air which shall be referred to as a dry oil mist. Such a dry oil mist is not suitable as a lubricant.

In order to produce a wet oil mist having comparatively larger droplets of oil from a dry oil mist, it is necessary to coalesce the small droplets of oil.

As shown in FIGS. 1 and 2, conventional lubricating devices for plural-row tapered roller bearings using dry oil mist generally includes a mist nozzle C positioned in an oil mist supply aperture B in a housing A. The oil mist injected through the nozzle C flows around the periphery of a spacing member D in an annular mist groove E formed in the outer periphery of the spacer member D or in the inner face of the housing A.

A dry oil mist created by an oil mist generator moves in laminar flow at a velocity of approximately 5 m/sec. through a conduit connecting the oil mist generator and the oil mist supply aperture B in the housing A. The dry oil mist then flows through the mist nozzle C at a high velocity thereby producing a turbulent flow and becoming wet oil mist which flows into the interior of the bearing through mist inlets $F_1$ and $F_2$ extending from along its circumference the annular groove E along its circumference toward the center of bearing.

The wet oil mist produced by the mist nozzle C spreads into the annular guide groove E, whereupon the pressure of the mist decreases. Consequently, the quantity of wet oil mist supplied to the bearing through the mist inlet $F_2$ which is remote from the nozzle C is much smaller than the quantity of wet oil mist supplied through the mist inlet $F_1$ which is closer to the nozzle C, as indicated by arrows in FIG. 2. With conventional mist lubrication systems, uniform and satisfactory lubrication of the bearing is not achieved.

Since the larger droplets of oil created when an oil mist passes through the mist nozzle C tend to adhere to the surfaces, many of the droplets will adhere to the interior surfaces of the annular mist guiding groove E before the mist passes through groove E and arrives at the mist inlets $F_1$ and $F_2$, therefore reducing the quantity of droplets flowing through the said mist inlets $F_1$ and $F_2$, to lubricate the bearing In addition, there is usually a clearance of approximately 0.1 – 0.3 mm between the outer surface of the outer bearing race and the inner surface of the housing to allow the easy insertion or removal of bearing into the housing. In such cases a portion of the wet mist from the mist nozzle C will be discharged through the clearance.

With a tapered roller bearing, a high thrust load acts between an end face H of a tapered roller G and a guide face L on the inner race K which are in sliding contact thereby generating heat, hence the nessecity of good lubrication. Particularly with high speed rotation devices, insufficient lubrication between the above-mentioned guide and end faces frequently causes seizing or galling of the bearing.

SUMMARY OF THE INVENTION

The present invention is a device for lubricating a roller bearing with oil mist in which a mist of small droplets of oil is injected from a peripheral passageway in an outer ring spacing member into the interior of the bearing where the small droplets of oil coalesce into larger droplets which uniformly lubricate the bearing surface. The principal object of the present invention is to provide a device which applies a uniform amount of the wet oil mist to various parts of a roller bearing thereby assuring improved lubrication for the bearing.

Another object of the present invention is to provide a roller bearing having improved rotational performance by ensuring sufficient lubrication between surfaces and the bearing which are in sliding contact to prevent, in particular, seizure between the rolling element and a guiding race face of the bearing during high speed rotation.

A further object of the present invention is to prevent leakage of oil mist from a roller bearing assembly through a clearance between a housing, which supports the roller bearing, and an outer circumferential surface of the bearing to more effeciently utilize the supply of the oil mist in the roller bearing.

BRIEF DESCRIPTION OF THE DRAWINGS

in FIG. 1;

DESCRIPTION OF THE PREFERRED EMBODIMENTS

Figure 3:
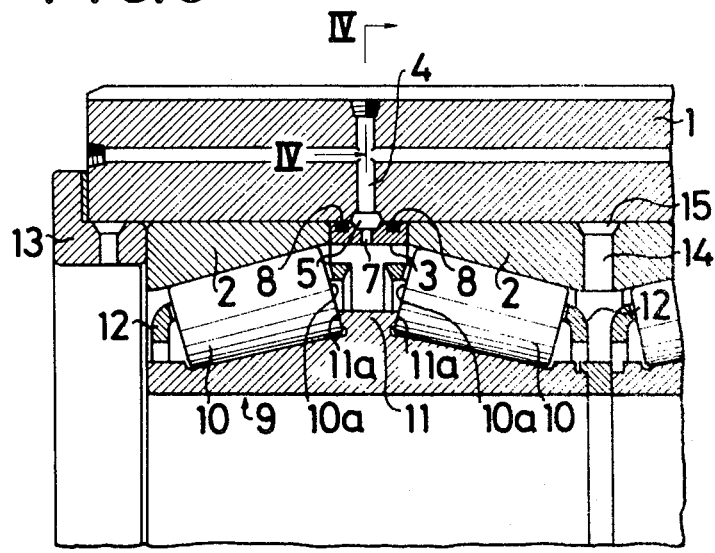
FIG. 3 is a fragmentary sectional view taken along the line III—III in FIG. 4 which shows the preferred embodiment.
Figure 4:
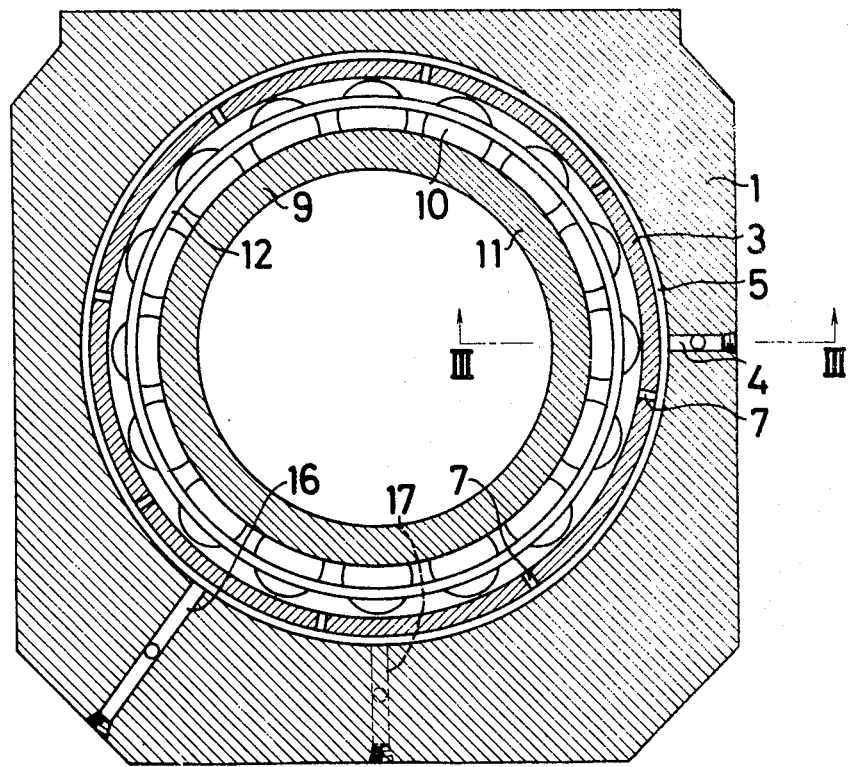
FIG. 4 is a sectional view taken along the line IV—IV in FIG. 3.

Referring to FIGS. 3 and 4, a housing surrounding and supporting a tapered roller bearing is indicated at 1, and an outer race of the bearing at 2. An annular outer race spacing member 3 locates the outer race 2 in position. A passageway 5 is formed in the outer periphery of the outer race spacing member 3 and in the inner face of the housing. Mist nozzles 7 extending through the spacing member 3 from passageway 5 toward the center of the bearing and are equidistantly spaced around passageway 5. The spacing member 3 has packings 8 on the adjacent opposite sides of the passageway 5 to seal between the spacing member 3 and an inner face of the housing 1 prevent leakage of the oil mist from a clearance between the outer surface of the outer race 2 and the inner surface of the housing 1 when the pressure of the oil mist increases.

An inner race 9 has a flange 11 for guiding tapered rollers 10. An end face 10a of the tapered roller and a side face 11a of the flange contact each other and create sliding friction. Further illustrated in the figures are retainers 12, an outer race spacing member 13, an outlet 14 from which the mist flows after lubricating the bearing, a groove 15 for discharging the mist, a mist discharge outlet 16 formed in the housing and a drain 17 formed in the housing.

With reference to FIGS. 3 and 4, dry oil mist having small droplets of oil supplied from an oil mist generator is forced into the passageway 5 between the outer race spacing member 3 and the housing 1 through an oil mist inlet 4 and injected from mist nozzles 7 which extend from the passageway 5 toward the center of the bearing between a pair of rows of the tapered rollers. The small droplets of oil in the dry oil mist injected into the interior of the bearing coalesce to form a wet oil mist which lubricates faces of the inner race 9, outer race 2, end faces 10a of the rollers and guide faces 11a. After lubrication, the mist flows through the discharge groove 15 and outlet 16 to exit the housing 1.

In accordance with this invention, dry oil mist containing small droplets of oil fills the passageway 5 in the outer race spacing member 3 and coalesces into larger droplets after passing through the mist nozzles 7 which extend inwardly from the passageway 5. Accordingly, wet oil mist containing larger droplets of oil can be supplied uniformly into the interior of the bearing through each nozzle 7 irrespective of the closieness of the nozzle to the oil supply inlet 4 therefore the oil can be applied uniformly in the bearing for greatly improved lubrication.

Figure 5:
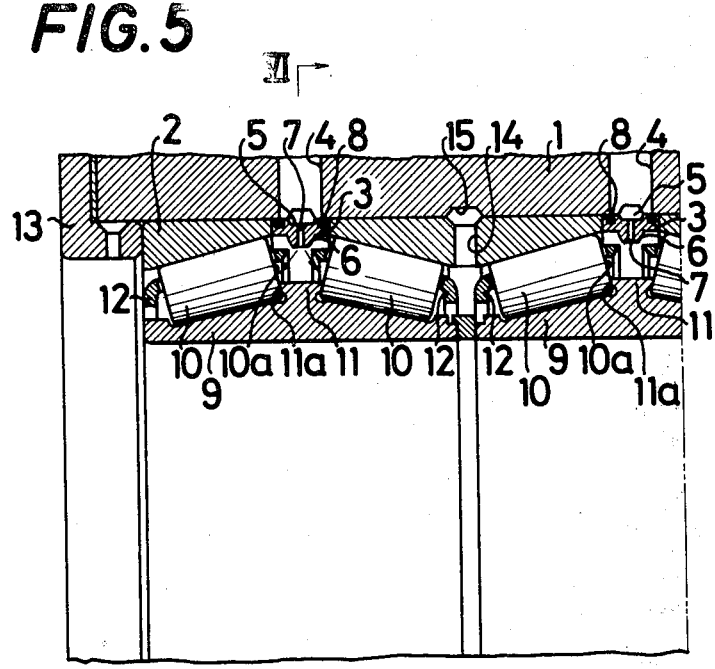
FIG. 5 is a fragmentary sectional view showing a modified embodiment of the present invention.
Figure 6:
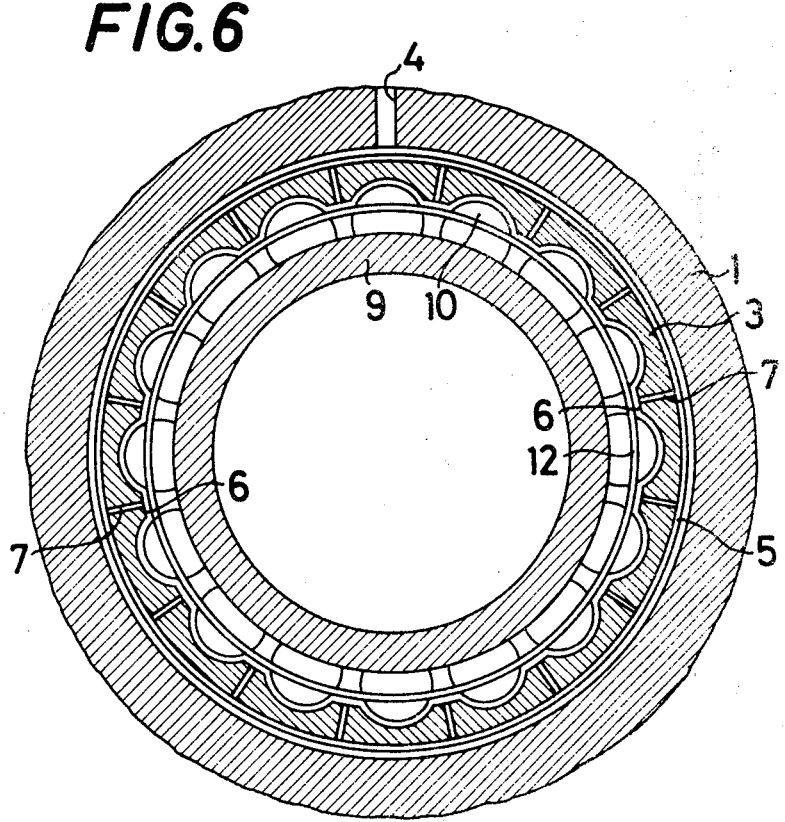
FIG. 6 is a sectional view taken along the line VI in FIG. 5.

In accordance with another embodiment of the present invention. shown in FIGS. 5 and 6, mist nozzles 7 in the outer race spacing member 3 having the oil mist closer to the surfaces of the bearing elements to be lubricated, enabling wet oil mist to be applied more effectively to the desired portions. Projections 6 an nozzles 7 extend from the inner surface of the spacing member 3 toward the center of the bearing and are equidistantly spaced about the passageway 5. The mist nozzles 7 are concentric with the projections 6 which positions them close to the flange 11 of the inner race 9 thereby permitting the wet oil mist to be injected closer to the end faces 10a of the rollers and flange faces 11a of the inner race to reduce friction between the faces. Satisfactory lubrication is achieved in this manner to prevent seizure of the bearing even when a machine is driven at high speed.

Figure 7:
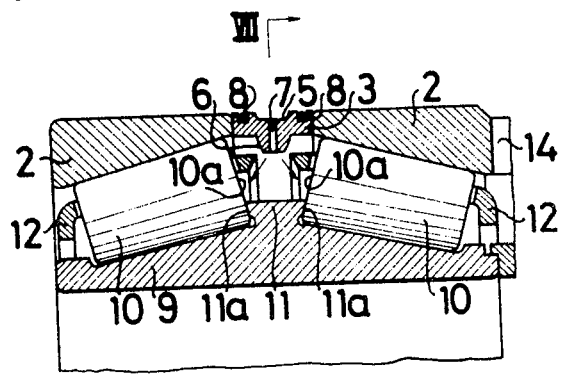
FIG. 7 is an enlarged sectional view showing a portion of the embodiment of the present invention shown in FIG. 5.

As shown on an enlarged scale in FIG. 7, the larger diameter end portion of the retainer 12 is located at the larger diameter end portion of the tapered roller in the tapered roller bearing. If the mist nozzle 7 is remote to these portions as in FIG. 3, part of the mist will be prevented by the retainer 12 from reaching the flange face 11a of the inner race 11, whereas if the nozzle 7 is provided in the projection 6 which extends inward as seen in FIG. 7, wet oil mist can be effectively forced against the roller end 10a and guide flange face 11a as indicated by the arrows thereby, providing effective lubrication for high speed rotation machines.

Figure 8:
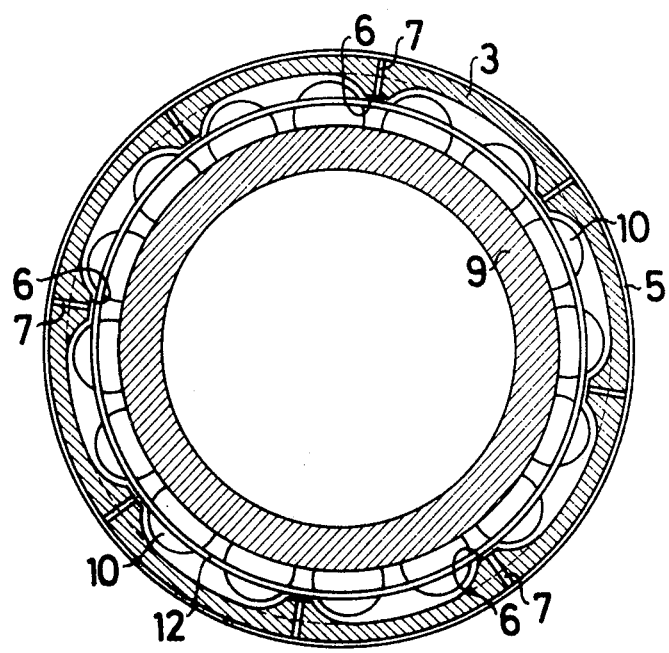
FIG. 8 is a sectional view of a modified embodiment of the present invention.

Although the embodiment of FIG. 6 includes as many nozzles 7 as tapered rollers 10 which is useful for high speed and heavy load rotary devices, there may be fewer nozzles than tapered rollers 10 as shown in FIG. 8. The number of the nozzles may be selected depending upon the loads and imposed on the bearing.

Figure 9:
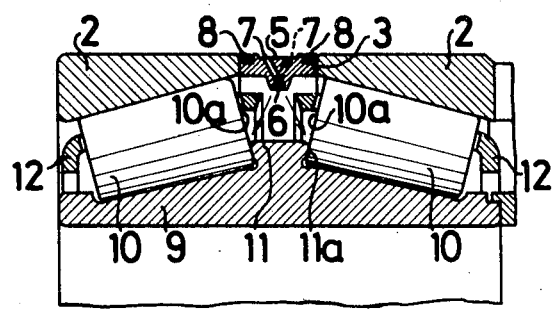
FIG. 9 is a fragmentary sectional view of an embodiment of the present invention including inclined nozzles.

As shown in FIG. 9, the mist nozzles 7 may extend obliquely through the outer race spacing member 3 toward the interior of the bearing, the nozzles in adjacent projections 6 being inclined in opposite directions as indicated in solid and dotted lines in the drawing.

Figure 10:
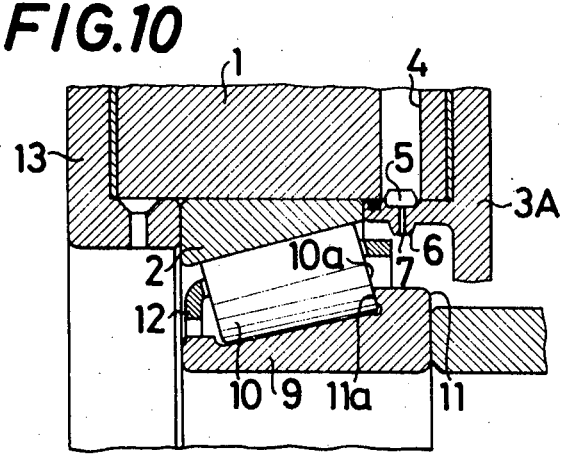
FIG. 10 is a fragmentary sectional view showing an embodiment of the present invention is a single-row tapered roller bearing.

The foregoing embodiments relate to plural-or four-row tapered roller bearings. in the case of a single-row tapered roller bearing, as shown in FIG. 10, the guide groove 5, projection 6 and nozzle orifice 7 can be incorporated in an outer ring locking member 3A on the greater inner diameter side of the outer ring. Oil mist may be supplied in the same manner as in the above embodiments.

Figure 11:
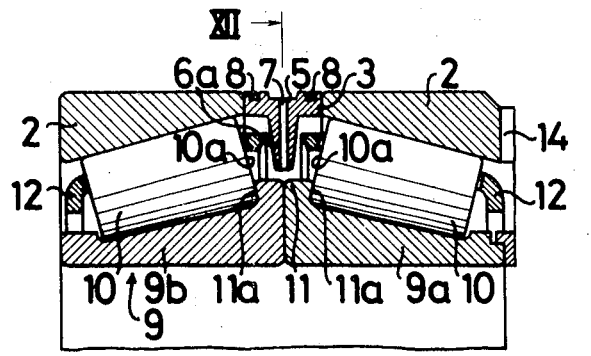
FIG. 11 is a fragmentary sectional view of an embodiment in which nozzles are disposed close to an inner ring of a bearing.
Figure 12:
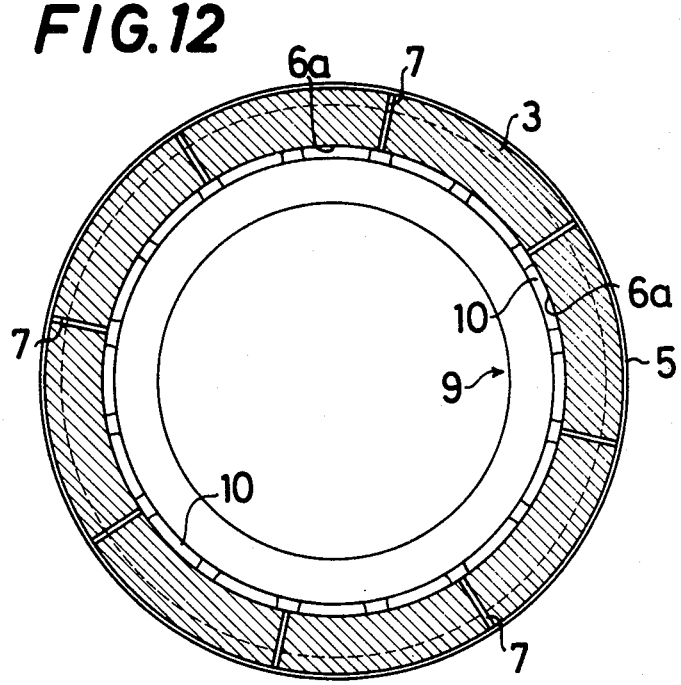
FIG. 12 is a sectional view taken along the line XII in FIG. 11.

In accordance with the embodiment shown in FIGS. 11 and 12, the nozzles 7 directed toward the interior of the bearing are positioned as close as possible to the inner race flange 11 for more direct supply of wet oil mist to the sliding friction faces 10a and 11a between the tapered rollers 10 and the guide flange 11. The outer race spacing member 3 has an annular flange portion 6a. The mist nozzles 7 extend through the annular flange 6a and open at the inner face of the flange portion 6a. In order to assure easy assembling of the plural-row tapered roller bearing having such construction, the inner race 9 comprises segments 9a and 9b. The segment 9a and the assembly of tapered rollers 10 and retainer 12 around the segment 9a are first fit in one outer race 2, and the other segment 9b is then fitted together with the assembly of rollers 10 and retainer 12. Finally another outer race 2, and the segment 9b is inserted into the housing 1. In this way the bearing can be assembled without any trouble, with the openings of the nozzles 7 positioned as close as possible to the inner race flange 11.

Figure 13:
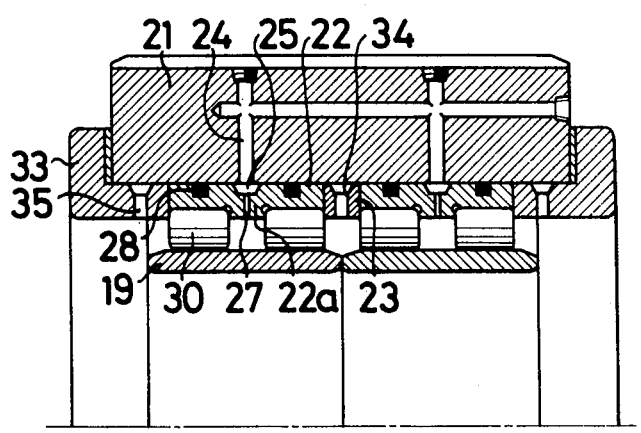
FIGS. 13 and 14 are fragmentary sectional views of embodiments of the present invention in cylindrical roller bearings.

FIG. 13 shows an embodiment of this invention having a bearing housing 21, an outer race 22, an outer race spacing member 23 an inner race 19, oil mist inlets 24 extending through the housing 21 and cylindrical rollers 30. The bearing of this embodiment is provided on the inner face of the outer race with flanges 22a for guiding the rollers. Oil mist passageway 25 of this invention is formed in the outer peripheral face of the outer race 22, at the same position as the flanges 22a. A nozzle orifice 27 extends from the passageway 25 toward the center of the bearing. Packings 28 are mounted round opposite ends of the outer race 22. Oil mist is forced into the interior of the bearing through mist nozzles 27 formed in the outer race 22 at several portions and lubricates the rollers 30 and race faces of the outer and inner races. After lubrication, the oil mist is discharged for example from a discharge outlet 34 in the outer race spacing member 23 or an outlet 35 in the outer race securing member 33.

Figure 14:
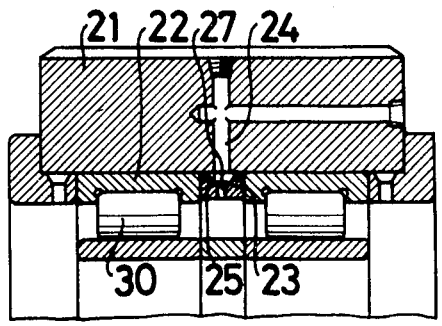

FIG. 14 shows an embodiment of the present invention as applied to a bearing including two single-row cylindrical roller bearing units. Outer races 22 of the single-row roller bearing units are mounted within a housing 21 with an outer race spacing member 23 interposed therebetween. The spacing member 23 is provided in its outer periphery with a passageway 25 communicating with an oil mist supply inlet 24 in the housing. Mist nozzles 27 are formed in the outer race spacing member 23.

Figure 1:
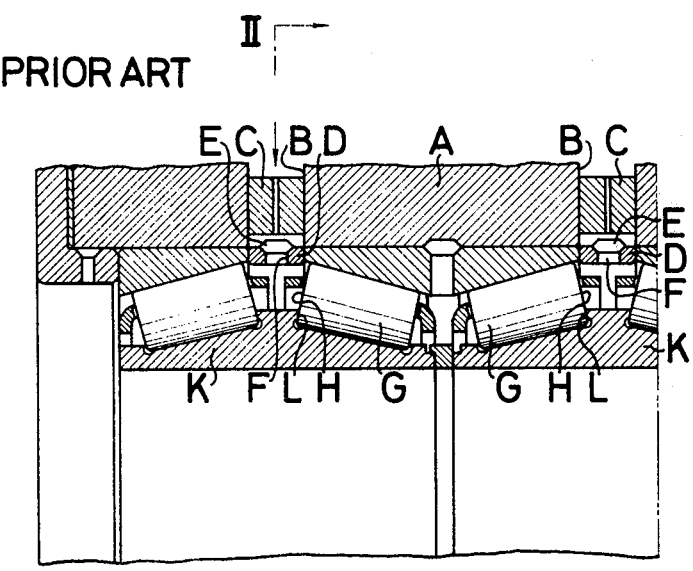
FIG. 1 is a fragmentary sectional view of the principal parts of a conventional lubricating device in a tapered roller bearing.
Figure 2:
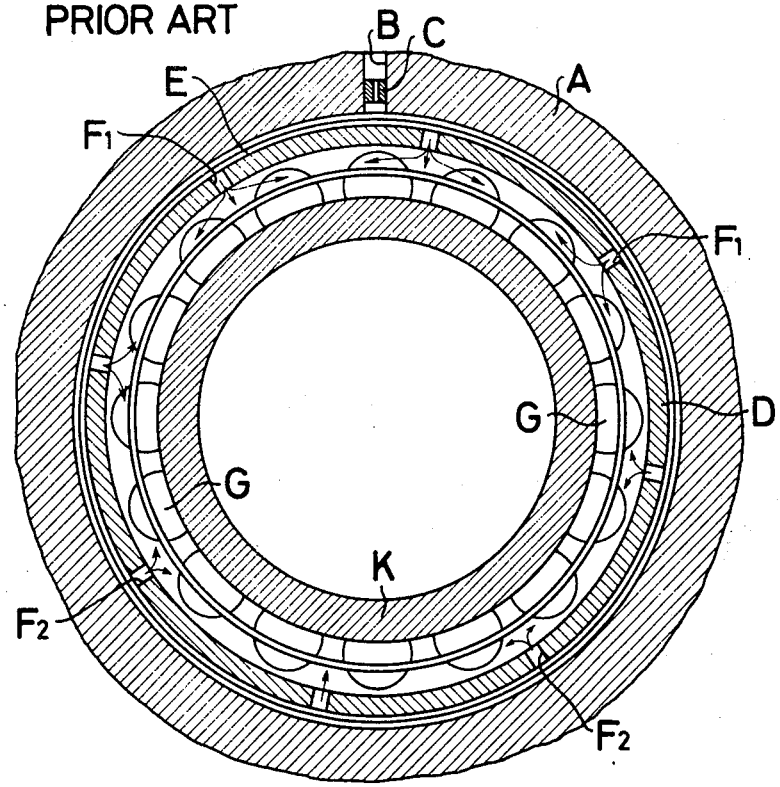
FIG. 2 is a sectional view taken along the line II—II.

This invention eliminates the mist nozzle fitting as shown in FIG. 1 which reduces the number of constituent parts of the oil mist supplying means and assures uniform application of oil mist to the desired portions of the bearing by producing large oil droplets adjacent the areas to be lubricated This invention is not limited to the embodiments described above. For example, the nozzle orifices in the embodiments of FIGS. 3, 11 and 12 may be inclined as shown in FIG. 9. Additionally the oil mist passageway 5 in the outer race spacing member 3 may be formed in the inner circumferential face of the housing.

Further, the packings in the embodiments of FIGS. 3, 5, 7, 9, 10, 11 and 14 may be used to maintain oiltight contact between the inner face of the housing and the outer face of the outer race by fitting said packings in annular grooves formed on the outer faces of the outer races on the opposite sides of the spacing member 3. Therefore, it should be understood that the spirit and scope of the invention is to be limited solely in light of the appended claims.

What is claimed is:

1. A double-row roller bearing lubricating device for a housing having a bore and a bearing assembly including a pair of outer races fitted to the bore of the housing, inner race means and a plurality of rollers disposed between the outer races and said inner race means said lubricating device comprising a dry oil mist inlet extending through the housing into the bore between the pair of outer races, a spacing member disposed between the outer races; an annular passageway extending around the spacing member in the bore of the housing communicating with the dry oil mist inlet for receiving dry oil mist therefrom; a plurality of mist nozzle means in the spacing member opening inwardly and communicating with the annular passageway; packing means on both sides of the annular passageway for effecting oil-tight sealing between the outer periphery of the spacing member and the bore of the housing for confining dry oil mist in said passageway between the outer periphery of the spacing member and a corresponding inner face of the bore in the housing so that dry oil mist is discharged from the passageway through said mist nozzle means and expands to supply wet oil mist between the rollers of the bearing assembly.

2. The roller lubricating device of claim 1 additionally including a plurality of equidistantly spaced projections extending inwardly from the spacing member and wherein said mist nozzle means extend through the projections for changing dry oil mist into wet oil mist.

3. The roller bearing lubricating device as set forth in claim 2, wherein the mist nozzle means in the projections extending the spacing member are tapered in alternate opposite inward directions.

4. The roller bearing lubricating device as set forth in claim 1 additionally including a flange portion extending from the spacing member between the bearing rollers and wherein the mist nozzle means are equidistantly spaced in the flange portion.

5. A roller bearing assembly comprising a housing defining a bore, an inner race means, outer race means in said bore, rollers disposed between said inner race means and said outer race means, flange means protruding from one of said race means adjacent and engaging an end of each of said rollers, a dry oil mist inlet extending through said housing into said bore adjacent the outer race, an annular guide groove means defining an annular passageway adjacent the outer race and communicating with the dry oil mist inlet for receiving dry oil mist from the inlet, sealing means adjacent the annular passageway for confining the dry oil mist to the annular passageway and a plurality of mist nozzle means communicating with the annular passageway for directing oil mist against the rollers and said flange means.

* * * * *